Patented July 30, 1935

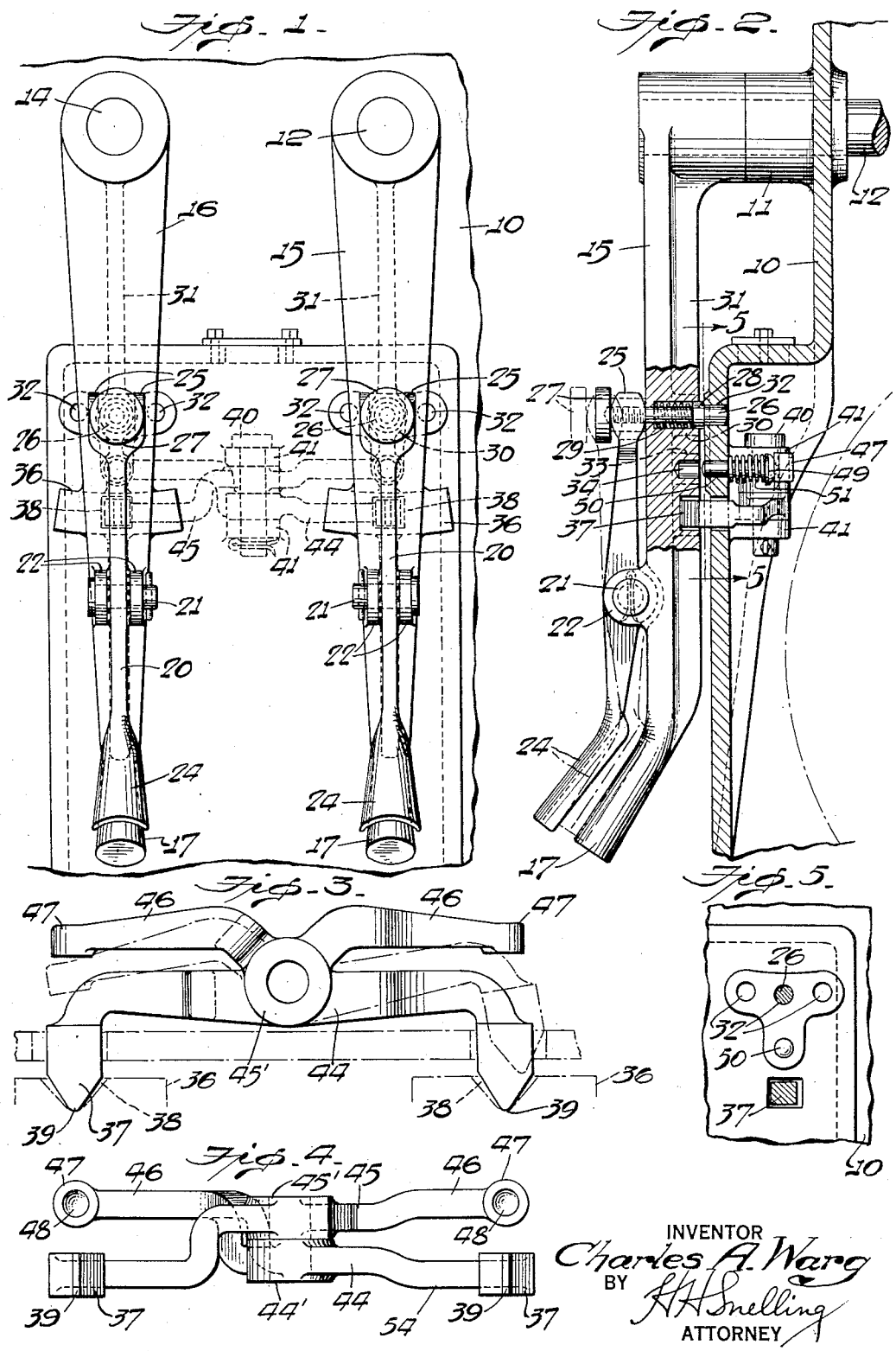

2,009,536

UNITED STATES PATENT OFFICE 2,009,536

SAFETY INTERLOCK

Charles A. Warg, Scranton, Pa., assignor to McClave-Brooks Company, Scranton, Pa., a corporation of Pennsylvania Application March 24, 1933, Serial No. 662,599

6 Claims. (Cl. 74—483)

This invention relates to safety interlocks particularly such as are suitable for use with chain grate stoker spur gear drive assemblies and has for its principal object the provision of a convenient interlock which will effectively prevent any movement of either of the usual two levers except when the other lever is in neutral position, this in order to prevent the engaging at the same time of two separate series of gearing in a change speed mechanism.

A further object of the present invention is the provision of a safety interlock in which either of the clutch shifting levers may be swung to the desired position with the use of one hand, not requiring both hands, as formerly.

In the drawing:—

Figure 1 is a front elevation showing both levers in neutral position.

Figure 2 is generally a side elevation but showing the drive gear housing in section.

Figure 3 is a top plan view of the two lock levers.

Figure 4 is a front elevation of the structure of Figure 3.

Figure 5 is an elevation on line 5—5 of Figure 2.

The safety interlock of the present invention is mounted upon the drive gear casing 10 in which are housed the various gears of the speed change mechanism interposed between the source of power and the main drive shaft of the chain grate. While my invention pertains primarily to chain grates it is obvious that the interlock can be used in connection with any sort of gear shifting mechanism. A boss such as 11, usually integral with the drive gear housing 10, provides a bearing for the two parallel rock shafts 12 and 14, firmly secured to which are the clutch shifting levers 15 and 16, these latter having at their lower ends the angularly offset handles 17. In the specific form shown the clutch shifting lever 15 may be thrown to the right from the position shown in order to move a clutch to engage the low speed gear. Should a reverse gear be provided, which is not the case with chain grate drives, this lever 15 would be moved to the left to engage such gear. The other clutch shifting lever 16 may move either to the left or to the right to engage the medium speed gear or the high speed gear as is usual in such construction.

Mounted on each of the clutch shifting levers 15 and 16 is a stop pin lifting lever 20 fulcrumed on a pivot pin 21 mounted in bearing ears 22 rising from the main portion of the clutch shifting lever. At its bottom end the stop pin lifting lever 20 is curved to provide a grip 24 which may snugly engage the relatively massive handle 17 of the clutch shifting lever. At its upper end the stop pin lifting lever 20 is forked as at 25 to receive the body of the stop pin 26, the head 27 of which is in constant engagement with the curved surface of the forked ends. The stop pin is received in a boss 30 preferably integral with the clutch shifting lever 15 and its central rib 31. The boss 30 has a central bore in it to house a spring 29 engaging the shoulder at the bottom of the bore and also constantly engaging a collar 28 on the stop pin 26, the collar 28 slidingly fitting the bore so as to aid in guiding the stop pin into one of the stop pin openings 32 in the drive gear housing 10. When the grip member 24 at the lower end of the stop pin lifting lever 20 is pressed against the generally cylindrical slightly bent handle 17, the stop pin head 27 is cammed outwardly by the fork 25, compressing the spring 29 and freeing the stop pin from the drive gear housing in order that the clutch shifting lever 15 may be moved about the axis of the rock shaft 12 or 14 as the case may be.

The central longitudinal web 31 of each clutch shifting lever is enlarged to form a second boss 33 having a central bore 34 to receive a lock pin whenever the lock pin is projected forwardly into such bore. An extended plate, preferably integral with the clutch shifting lever and its rear web, is provided as at 36 so as to project laterally to both sides of the lever at the rear affording a wide surface on which may ride the wedge 37 of the lock lever. The guide plate 36 has a central indentation 38 corresponding in shape to the nose of the wedge 37 so that should the wedge be held against the guide plate 36 it would ride smoothly over the two sides but would fall into the central opening 38 when the clutch shifting lever is in mid-position, but due to the cam action of the sloping sides of the wedge and of the opening any movement of the clutch shifting lever will move the wedge 37 rearwardly and cause the rounded point 39 of the wedge to ride on the smooth surface of the plate.

Referring particularly to Figure 1, the lock lever fulcrum pin 40 passes thru bearings 41 extending inwardly from the drive gear housing 10. This fulcrum pin 40 is the pivot for the two lock levers, the bottom lock lever bearing the general numeral 44 while the top lock lever is given numeral 45. These lock levers are of irregular shape and their two arms are at the same levels, the terms top and bottom referring solely to the position of the central integral bosses 44' and 45' which are mounted on the lock lever fulcrum pin 40 between the two bearings 41.

Referring particularly to Figures 3 and 4, each lock lever carries an upper and a lower arm, the upper arm 46 in each case carrying at its free end a knob 47 having on its forward face a circular depression 48 to engage the rounded head 49 of the proximate lock pin 50, this pin being slidable thru an opening in the drive gear housing and being constantly held in engagement with the knob 47 by means of a spring 51 surrounding the lock pin between its head 49 and the wall of the drive gear housing.

The urge of the spring 51 constantly tends to move the stop pin away from the boss 33 on the clutch shifting lever and hence to hold the stop pin 50 out of the bore 34 so as to allow free movement of the clutch shifting lever 15 or 16. This spring 51 consequently causes a constant tendency of the knob 47 of each lever to move rearwardly. Such movement however requires that the lower arm 54 of the lock lever shall move forward and this is possible only when the wedge 37 is engaged in the central opening 38 in the guide plate 36 which is usually integral with the clutch shifting lever. Whenever either clutch shifting lever is moved the wedge 37 which engages that lever is cammed rearwardly and this action causes the stop pin 50, which is engaged by the knob at the other end of the lock lever, to push the lock pin thru the opening in the gear housing and into the bore 34. If the bore 34 is not in position to receive the lock pin, the wedge 37 is prohibited from moving out of the opening 38, and hence the clutch shifting lever is locked into position except when the opposite clutch shifting lever is in neutral.

The operation of the device is as follows: With both clutch shifting levers in neutral position the operator with one hand moves the grip 25 against the handle 17, releasing the stop pin 26 from the central stop pin opening 32 and moves the lever in the direction desired. Such movement immediately cams the wedge 37 rearwardly and this action moves the upper integral arm 46 of the lock lever forwardly. The spring 51 readily yields and the lock pin 50 moves into the alined bore 34. Since the wedge which has been moved now rides upon the guiding surface of the plate 36, the lock pin is held within the bore 34 until the lever has been returned to neutral. While the lever is away from neutral the opposite clutch shifting lever is firmly locked because it is held by the lock pin 50. It is therefore impossible to move more than one of the clutch shifting levers from neutral at the same time and there is consequently no possibility of harming the gears of the change speed mechanism

What I claim is:

1. In combination, a pair of operating levers each having a socket therein, a pair of spring pressed lock pins positioned to register respectively with the adjacent sockets when the levers are in neutral position, and a pair of lock levers operated by the swinging movement of either operating lever for causing the lock pin of the other lever to be compressed against its spring action and to enter the registering socket to lock said other lever against swinging movement whenever the first lever is swung from neutral position, said lock levers being independently pivoted to swing about a single vertical axis.

2. A pair of operating levers, a stop pin carried by each lever, a stop pin lifter pivotally carried by each lever and having a grip adjacent the handle end of said lever so that the stop pin can be withdrawn by the pressing of the grip of the lifter against the handle of the lever in the shifting operation, and further means operable upon the shifting of either lever for locking the other lever in neutral position.

3. In combination, a drive gear housing, a pair of parallel rock shafts pivoted in said housing in spaced relation, a vertical clutch shifting lever on each rock shaft, each lever having a pair of indentations therein, a pair of independently operable lock levers pivoted to said housing and each having a pair of indentation engaging ends, the one end of each lock lever engaging one of the clutch shifting levers and means at the other end of the same lock lever for engaging the other clutch shifting lever, and yielding means for urging each lock lever to engage only one of said indentations.

4. The device of claim 3 in which the engaging end of each lock lever has an automatically releasable engagement with one of said levers and said means at the other end of each lock lever has a snug locking engagement with the other clutch shifting lever whereby when either clutch shifting lever is moved it will automatically move its respective lock lever so as to lock the other clutch shifting lever in neutral position.

5. In combination, a pair of operating levers each having a plurality of positions, a lock pin positioned to engage and lock one of said levers in one of said positions, a second lock pin positioned to engage and lock the other of said levers in the same relative position, yielding means for holding each lock pin out of locking engagement, a pivoted member in the path of one operating lever for moving the lock pin of the other operating lever into locking engagement as said one operating lever is moved out of said one position, a second pivoted member in the path of the other operating lever for moving the lock pin of the one operating lever into locking engagement as said other operating lever is moved out of said same relative position.

6. In combination, a pair of levers each having a plurality of operating positions, locking means for locking each lever in a predetermined position, spring means for rendering said locking means inoperative while said levers are both in said predetermined positions whereby both levers are unlocked while in said predetermined positions, a locking lever for overcoming one of said spring means and operating its corresponding locking means to lock one of said operating levers in said predetermined position, camming means on the other operating lever for engaging and actuating said locking lever, a second locking lever for overcoming the other spring means and operating the other locking means to lock said other operating lever and camming means on said one operating lever for engaging and actuating said second locking lever whereby whichever operating lever is left in said predetermined position is always locked against movement until the other operating lever is returned to said position.

CHARLES A. WARG.